United States Patent [19]
Shibahata et al.

[11] Patent Number: 5,692,987
[45] Date of Patent: Dec. 2, 1997

[54] POWER TRANSMITTING SYSTEM FOR VEHICLE

[75] Inventors: Yasuji Shibahata; Kenji Honda; Tetsushi Asano, all of Wako, Japan

[73] Assignee: Honda Giken Kogyo Kabushiki Kaisha, Tokyo, Japan

[21] Appl. No.: 497,557

[22] Filed: Jun. 30, 1995

[30] Foreign Application Priority Data

Jul. 5, 1994 [JP] Japan ................. 6-153324
Oct. 18, 1994 [JP] Japan ................. 6-251869

[51] Int. Cl.$^6$ ................................ B60K 17/20
[52] U.S. Cl. ........................ 475/204; 475/206
[58] Field of Search ............. 475/204, 205, 475/225

[56] References Cited

U.S. PATENT DOCUMENTS 3,859,871 1/1975 Koichiro et al. ............... 475/282

FOREIGN PATENT DOCUMENTS

| 546 733 | 6/1993 | European Pat. Off. . |
|---|---|---|
| 575 151 | 12/1993 | European Pat. Off. . |
| 575 152 | 12/1993 | European Pat. Off. . |
| 662 402 | 7/1995 | European Pat. Off. . |
| 5-131855 | 5/1993 | Japan . |
| 933010 | 7/1963 | United Kingdom . |
| 1261471 | 1/1972 | United Kingdom . |
| 1294142 | 10/1972 | United Kingdom . |

*Primary Examiner*—Dirk Wright
*Attorney, Agent, or Firm*—Armstrong, Westerman, Hattori, McLeland & Naughton

[57] ABSTRACT

A ring gear of a differential connected to an engine, and a sun gear and a planetary carrier are connected to left and right output shafts of the differential. A first pinion and a second pinion integrally formed and having different circle radii are carried on a carrier member which is rotatably fitted over the left output shaft. The first pinion is connected to the right output shaft, while the second pinion is connected to the left output shaft. When a hydraulic clutch is brought into an engaged state during clockwise turning of a vehicle, the carrier member is decelerated to accelerate a left front wheel, and a torque is transmitted to the left front wheel. When a hydraulic clutch is brought into an engaged state during counterclockwise turning of a vehicle, the carrier member is accelerated to accelerate a right front wheel, and a torque is transmitted to the right front wheel.

6 Claims, 8 Drawing Sheets

FIG.8

POWER TRANSMITTING SYSTEM FOR VEHICLE

BACKGROUND OF THE INVENTION

1. Field of the Invention

The present invention relates to a power transmitting system for a vehicle for delivering a torque between left and right wheels or between front and rear wheels by provision of a torque transmitting means capable of transmitting the torque between two rotary shafts.

2. Description of the Prior Art

A differential provided in a power transmitting system is designed so as to absorb a difference in rotational speed produced between left and right wheels during turning of the vehicle and to equally transmit an engine torque to the left and right wheels. However, it is desirable that when the vehicle is traveling at a medium or lower speed, a larger amount of torque is transmitted to a wheel which is an outer wheel during turning of the vehicle, and when the vehicle is traveling at a higher speed, a larger amount of torque is transmitted to a wheel which is an inner wheel during turning of the vehicle, thereby enhancing the travel stability performance.

A power transmitting device is known from Japanese Patent Application Laid-open No. 131855/93, which is designed so that the differential is positively controlled based on a rotational angle of a steering wheel and a vehicle speed, and a torque suited to the current operational state is transmitted to the left and right wheels.

In the power transmitting device described in Japanese Patent Application Laid-open No. 131855/93, a rotary shaft is disposed radially outwardly of a pair of hydraulic clutches and as a result, the power transmitting device has an increased size and hence, is difficult to mount in the vehicle.

SUMMARY OF THE INVENTION

Accordingly, it is an object of the present invention to eliminate the rotary shaft disposed radially outwardly of the hydraulic clutch in the known power transmitting system to reduce the size of the power transmitting device.

To achieve the object, according to the present invention, there is provided a power transmitting system for a vehicle, comprising a torque transmitting means mounted between two rotary shafts and capable of transmitting a torque between the two rotary shafts, the torque transmitting means comprising a carrier member rotatably carried for rotation about one of the rotary shafts, first and second pinions integrally formed to have different pitch circle radii and rotatably carried on the carrier member, connecting means for connecting the first and second pinions to the rotary shafts, a carrier member accelerating means for accelerating the carrier member, and a carrier member decelerating means for decelerating the carrier member.

With the above arrangement, it is possible to transmit the torque from one of the rotary shafts to the other rotary shaft by accelerating the carrier member by the carrier member accelerating means and to transmit the torque from the other rotary shaft to the one rotary shaft by decelerating the carrier member, thus enhancing the turning performance and the travel stability performance of the vehicle. In addition, the carrier member carried for rotation about the one rotary shaft is only accelerated and decelerated and therefore, it is possible to eliminate the rotary shaft conventionally disposed outside the known clutch to provide a reduction in size of the power transmitting system.

In addition to the above arrangement, the carrier member accelerating means may comprise a planetary gear device and an accelerating clutch, and the planetary gear device may comprise three elements, i.e., a sun gear, a ring gear and a planetary carrier, and a first one of the three elements is connected to the one of the rotary shafts and a second one of the three elements is connected to the carrier member, and the accelerating clutch connects a third one of the three elements to a fixing member. With this construction, it is possible to accelerate the carrier member by a simple structure. Moreover, the accelerating clutch is disposed between the third element and the fixing member and therefore, when a hydraulic clutch is employed, oil passages for supplying and discharging a working oil can be easily made.

In addition to the above arrangement, the carrier member decelerating means may comprise a decelerating clutch for connecting the carrier member to the fixing member, or the carrier member decelerating means may comprise a decelerating clutch for connecting a restricting ring gear meshed with the first and second pinions to the fixing member. With this construction, it is possible to decelerate the carrier member by a simple structure. Moreover, since the decelerating clutch is disposed between the carrier member or the restricting ring gear and the fixing member and therefore, when a hydraulic clutch is employed, oil passages for supplying and discharging a working oil can be easily made.

To achieve the object, according to the second object, there is provided a power transmitting system for a vehicle, comprising a torque transmitting means mounted between two rotary shafts and capable of transmitting a torque between the two rotary shafts, the torque transmitting means comprising a carrier member rotatably carried for rotation about one of the rotary shafts, a plurality of triple-pinion members which are rotatably carried on the carrier member and each of which includes first, second and third pinions provided thereon non-rotatably relative to one another and having different pitch circles, a first connecting means for connecting the first pinion to the other rotary shaft, a second connecting means for connecting the second pinion to the one rotary shaft, a third connecting means for connecting the third pinion to a fixing member, and a fourth connecting means for connecting the carrier member to the fixing member.

With the above arrangement, it is possible to distribute a torque between both the rotary shafts, as desired, by connecting the third pinion to the fixing member by the third connecting means to accelerate the carrier member or by connecting the carrier member to the fixing member to decelerate the carrier member. Moreover, in addition to the rotary shaft conventionally disposed outside the clutch, the planetary gear device can be eliminated and hence, it is possible to reduce the number of parts and the size and the manufacture cost of the system.

In addition to the above arrangement, the N-number (N=2, 3, 4, 5, 6, . . . ) of triple pinion members may be integrally formed and disposed at equal distances on a circumference of the carrier member. The number of teeth each of the first, second and third pinions may be any of M, 2M, 3M, 4M, 5M . . . (M=a minimum number of teeth of each of the first, second and third pinions), and the number of teeth of each of a first sun gear of the first connecting means meshed with the first pinion, a second sun gear of the second connecting means meshed with the second pinion and a third sun gear of the third connecting means meshed with the third pinion may be any of 2N, 3N, 4N, 5N, 6N . . . . Thus, since the number of teeth of each of the first, second and third pinions is any of M, 2M, 3M, 4M, 5M . . . , the phases of the first, second and third pinions can be circumferentially trued up. Therefore, in assembling the triple pinion members, the positioning in a rotating direction is not required, substantially enhanced assemblability. In addition, because the number of teeth of each of the first, second and third sun gears is any of 2N, 3N, 4N, 5N, 6N . . . , even if the triple pinion members are formed from the same member, it is possible to mesh the first, second and third pinions with the first, second and third sun gears, respectively, thereby reducing the manufacture cost of the triple pinion members.

The above and other objects, features and advantages of the invention will become more apparent from the following description of preferred embodiments taken in conjunction with the accompanying drawings.

DESCRIPTION OF THE PREFERRED EMBODIMENTS

A first embodiment of the present invention will now be described with reference to FIGS. 1 to 3.

Figure 1:
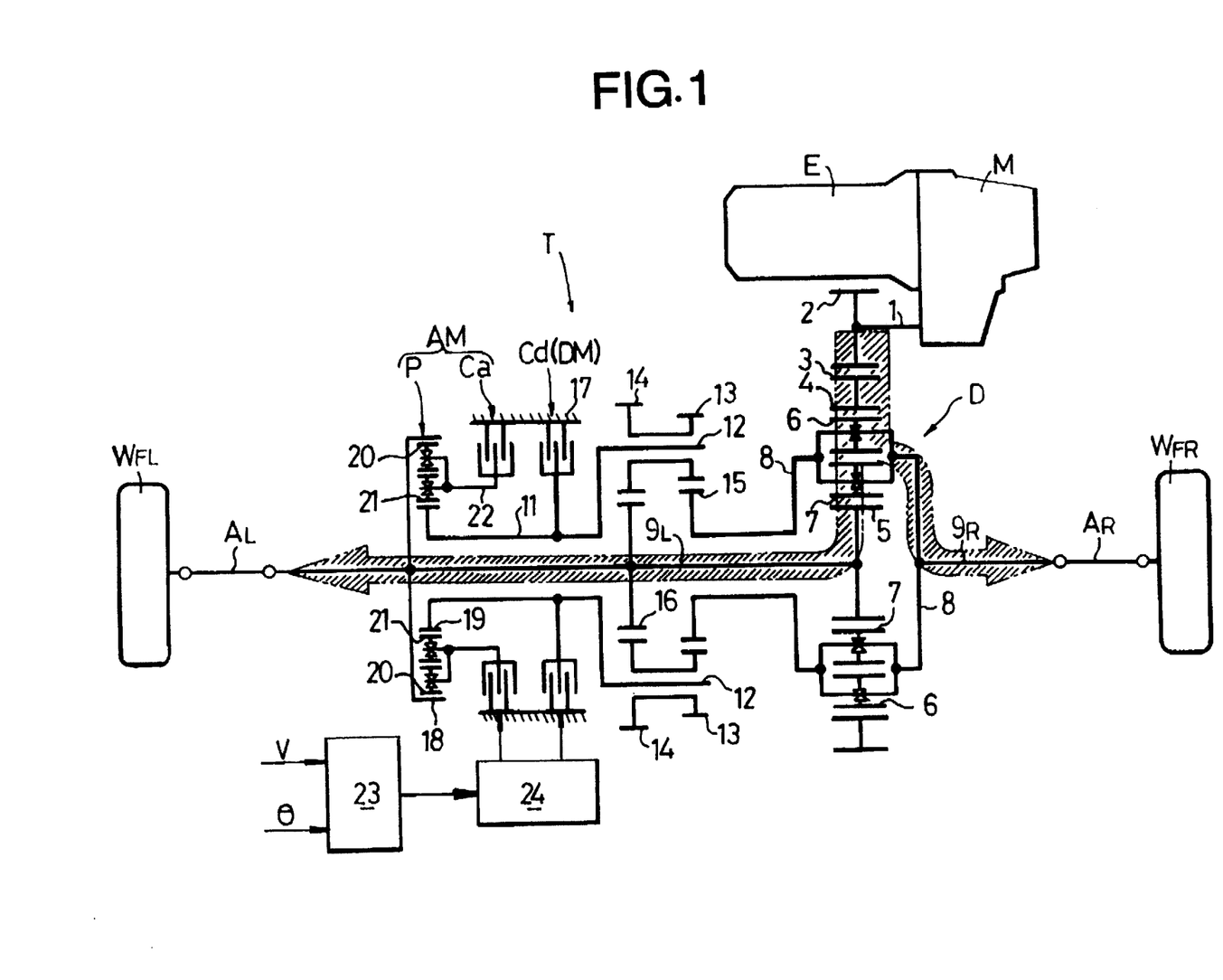
FIG. 1 is a skeleton illustration of a power transmitting system in a front engine and front drive vehicle according to a first embodiment of the present invention.

Referring to FIG. 1, a transmission M is connected to a right end of an engine E laterally mounted at a front portion of a vehicle body, and a torque transmitting means T is disposed in the rear of the engine E and the transmission M. A left front wheel $W_{FL}$ and a right front wheel $W_{FR}$ are connected to a left axle $A_L$ and a right axle $A_R$, which extend leftwardly and rightwardly from left and right ends of the torque transmitting means T, respectively.

The torque transmitting means T includes a differential D to which a driving force is transferred from an external-tooth gear 3 meshed with an input gear 2 provided on an input shaft 1 extending from the transmission M. The differential D comprises a double pinion type planetary gear mechanism and is comprised of a ring gear 4 integral with the external-tooth gear 3, a sun gear 5 coaxially disposed within the ring gear 4, and a planetary carrier 8 on which an outer planetary gear 6 meshed with the ring gear 4 and an inner planetary gear 7 meshed with the sun gear 5 are carried in a mutually meshed condition. In the differential D, the ring gear 4 functions as an input element, and the sun gear 5 functioning as one of output elements is connected to the left front wheel $W_{FL}$ through a left output shaft $9_L$, while the planetary carrier 8 functioning as the other output element is connected to the right front wheel $W_{FR}$ through a right output shaft $9_R$. The left and right output shafts $9_L$ and $9_R$ constitute a rotary shaft in one embodiment of the present invention.

A plurality of pinion shafts 12 are formed at a right end of a carrier member 11 which is rotatably supported on an outer periphery of the left output shaft $9_L$. A first pinion 13 and a second pinion 14, formed integrally with each other, are rotatably carried on each of the pinion shafts 12. A first sun gear 15 is rotatably carried around the outer periphery of the left output shaft $9_L$ and meshed with the first pinion 13. The first sun gear 15 is connected to the planetary carrier 8 of the differential D. A second sun gear 16 is fixed to the outer periphery of the left output shaft $9_L$ and meshed with the second pinion 14.

The number of teeth of the first sun gear 15, represented by Za in the formula which follows, is set larger than the number of teeth of the second sun gear 16, represented by Zb, that is, Za>Zb. The number of teeth of the first pinion 13, represented by Zc, is set smaller than the number of teeth of the second pinion 14 represented by Zd, that is, Zc<Zd. In this case, modules of the first and second sun gears 15 and 16 and the first and second pinions 13 and 14 are set equally.

The sun gear 16 connects the second pinion 14 to the left output shaft $9_L$ and constitutes a connecting means with wheel $W_{FL}$. The first sun gear 15 and the planetary carrier 8 connects the first pinion 13 to the right output shaft 9R and constitutes a connecting means with wheel $W_{FR}$.

A decelerating hydraulic clutch Cd is disposed between the carrier member 11 and a casing 17 as a fixing member. The decelerating hydraulic clutch Cd reduces the number of rotations of the carrier member 11 by the engagement thereof and constitutes a carrier member decelerating means DM.

A double pinion type planetary gear device P is mounted at a left end of the carrier member 11 and includes a ring gear 18 secured to the left output shaft $9_L$, a sun gear 19 secured to the carrier member 11, and a planetary carrier 22 on which an outer planetary gear 20 meshed with the ring gear 18 and an inner planetary gear 21 meshed with the sun gear 19 are carried in a mutually meshed condition. The planetary carrier 22 is capable of being coupled to the casing 17 through an accelerating hydraulic clutch Ca. The planetary gear device P and the accelerating hydraulic clutch Ca serve to increase the number of rotations of the carrier member 11 by the engagement of the accelerating hydraulic clutch Ca, and constitute a carrier member accelerating means Am.

Because the decelerating hydraulic clutch Cd and the accelerating hydraulic clutch Ca are disposed between the carrier member 11 and the housing 17, oil passages for supplying and discharging a working oil to and from both the hydraulic clutches Ca and Cd can be defined in the casing 17, thereby simplifying the structure.

An electronic control unit 23, to which a vehicle speed V and a steering angle θ are inputted, controls the decelerating hydraulic clutch Cd and the accelerating hydraulic clutch Ca through a hydraulic circuit 24.

The operation of the first embodiment of the present invention will be described below.

When the vehicle is traveling in a straight path, both of the decelerating hydraulic clutch Cd and the accelerating hydraulic clutch Ca are brought into non-engaged states.

This releases the restriction of the carrier member 11 and the planetary carrier 22 of the planetary gear device P, so that all of the left axle $9_L$, the right axle $9_R$, the planetary carrier 8 of the differential D, the carrier member 11 and the planetary carrier 22 of the planetary gear device P are rotated in unison. During this time, the torque from the engine E is transmitted through the differential D equally to the left and right front wheels $W_{FL}$ and $W_{FR}$, as shown by an obliquely-lined arrow in FIG. 1.

Figure 2:
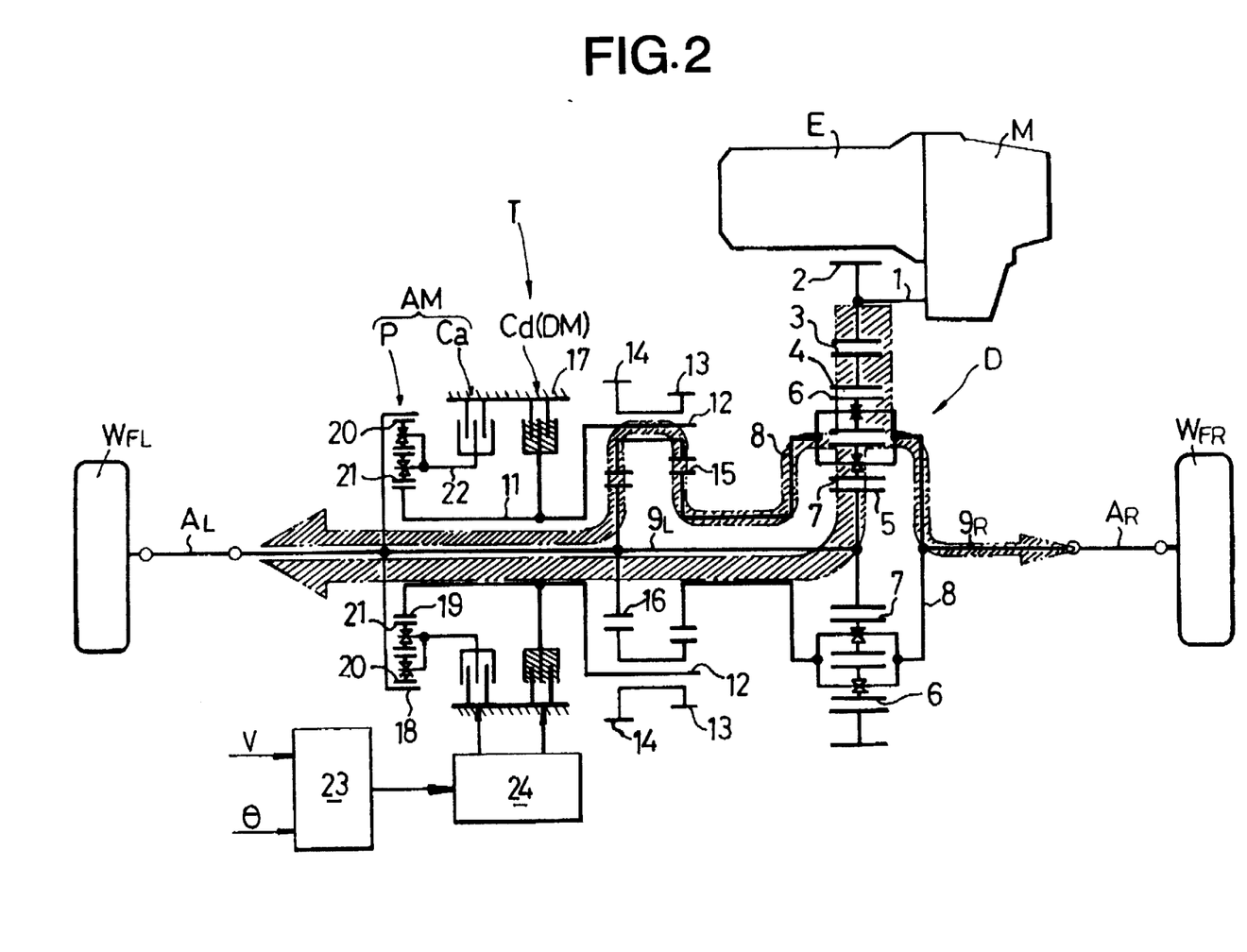
FIG. 2 is an illustration for explaining the operation of the power transmitting system during clockwise turning of the vehicle.

When the vehicle is turning rightward (in a clockwise direction), the decelerating hydraulic clutch Cd is brought into an engaged state through the electronic control unit 23 and the hydraulic circuit 24, as shown in FIG. 2, thereby coupling the carrier member 11 to the casing 17. At this time, the left output shaft $9_L$, integral with the left front wheel $W_{FL}$, and the right output shaft $9_R$, integral with the right front wheel $W_{FR}$ (and thus the planetary carrier 8 of the differential D) are interconnected through the second sun gear 16 (having the number of teeth Zb), the second pinion 14 (having the number of teeth Zd), the first pinion 13 (having the number of teeth Zc) and the first sun gear 15 (having the number of teeth Za) and hence, the left front wheel $W_{FL}$ is accelerated at a ratio of $(Za/Zc) \times (Zd/Zb)$ relative to the right front wheel $W_{FR}$. Thus, the following relation is established between the number of rotations of the left front wheel $W_{FL}$ and the number of rotations of the right front wheel $W_{FR}$.

$$N_L = \left( \frac{Za \times Zd}{Zc \times Zb} \right) \times N_R \qquad (1)$$

When the number $N_L$ of rotations of the left front wheel $W_{FL}$ is increased relative to the number $N_R$ of rotations of the right front wheel $W_{FR}$ in the above manner, a portion of the torque of the right front wheel $W_{FR}$ which is an inner wheel during turning of the vehicle is transmitted to the left front wheel $W_{FL}$ which is an outer wheel during turning of the vehicle, as shown by an obliquely lined arrow in FIG. 2.

If the number of rotations of the carrier member 11 is reduced by properly adjusting the engagement force of the decelerating hydraulic clutch Cd in place of stoppage of the carrier member 11 by the decelerating hydraulic clutch Cd, the number $N_L$ of rotations of the left front wheel $W_{FL}$ can be increased relative to the number $N_R$ of rotations of the right front wheel $W_{FR}$ in accordance with such deceleration. Thus, any torque can be transmitted from the right front wheel $W_{FR}$ which is the inner wheel during turning of the vehicle to the right to the left front wheel $W_{FR}$ which is the outer wheel during such turning of the vehicle.

On the other hand, when the vehicle is turning in a counterclockwise direction, i.e. to the left, the accelerating hydraulic clutch Ca is brought into the engaged state through the electric control unit 23 and the hydraulic circuit 24, thereby coupling the planetary carrier 22 of the planetary gear device P to the casing 17. As a result, the number of rotations of the carrier member 11 (thus, the number of rotations of the sun gar 19 having the number of teeth Zf) is increased at a ratio of Ze/Zf relative to the number of rotations of the left output shaft $9_L$ (thus, the number of rotations of the ring gear 18 having the number of teeth Ze). Therefore, the number $N_R$ of rotations of the right front wheel $W_{FR}$ is increased relative to the number of rotations of $N_L$ of the left front wheel $W_{FL}$ according to a relation represented by the following expression.

$$N_R = \left\{ \frac{Zc \times Zb}{Za \times Zd} \times \left(1 - \frac{Ze}{Zf}\right) + \frac{Ze}{Zf} \right\} \times N_L \qquad (2)$$

As apparent from the comparison of the expression (1) and the expression (2), the acceleration ratio of the left front wheel $W_{FL}$ to the right front wheel $W_{FR}$ and the acceleration ratio of the right front wheel $W_{FR}$ to the left front wheel $W_{FL}$ can be equalized to each other by setting, at a little more than 2.0, the ratio Ze/Zf of the number Ze of teeth of the ring gear 18 to the number Zf of teeth of the sun gear 19 of the planetary gear device P.

Figure 3:
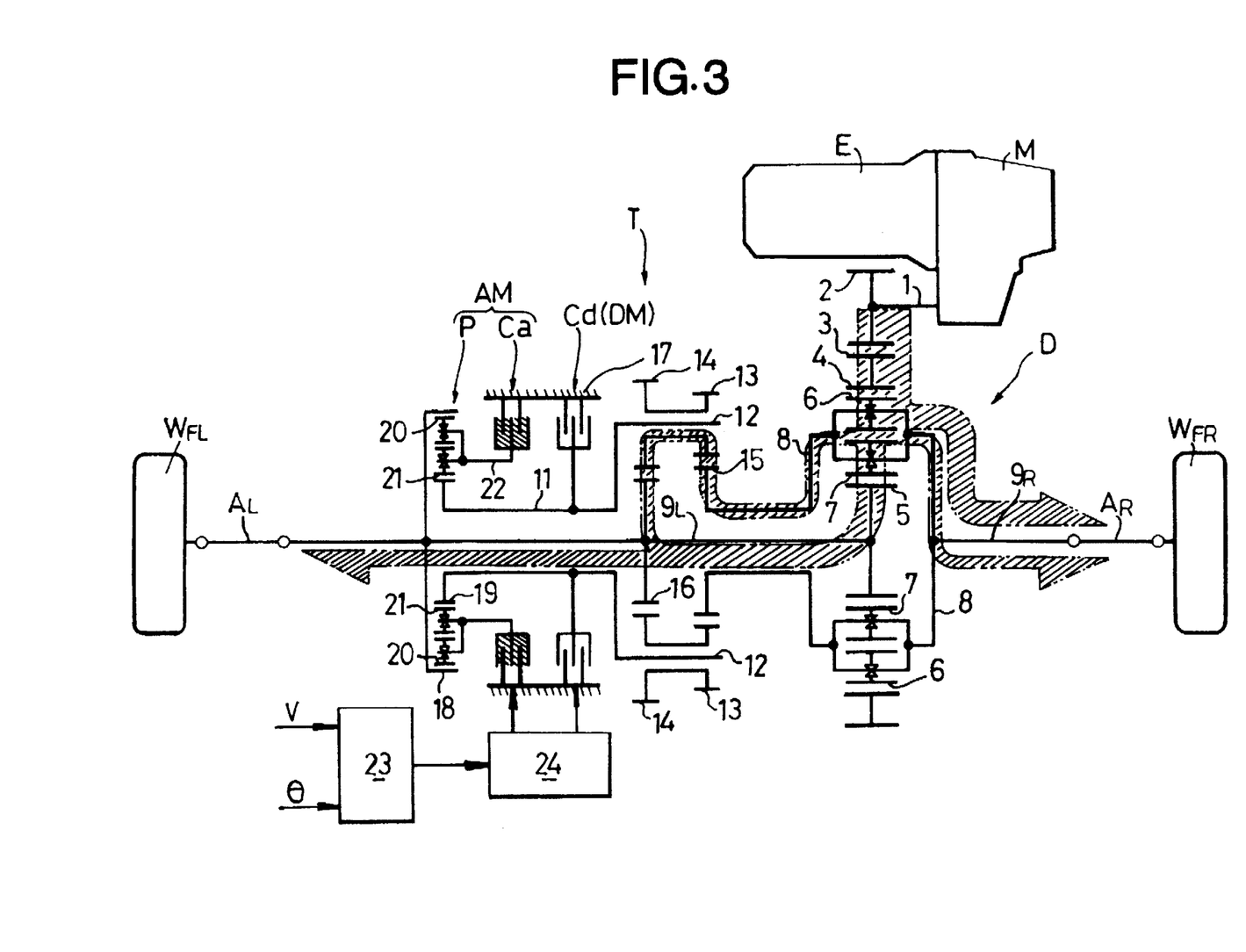
FIG. 3 is an illustration for explaining the operation of the power transmitting system during counterclockwise turning of the vehicle.

When the number $N_R$ of rotations of the right front wheel $W_{FR}$ is increased relative to the number $N_L$ of rotations of the left front wheel $W_{FL}$ in the above manner, a portion of the torque of the left front wheel which is the inner wheel during turning of the vehicle can be transmitted to the right front wheel $W_{FR}$ which is the outer wheel during turning of the vehicle, as shown by an obliquely lined arrow in FIG. 3. Even in this case, if the engagement force of the accelerating hydraulic clutch Ca is properly adjusted to increase the number of rotations of the carrier member 11, the number $N_R$ of rotations of the right front wheel $W_{FR}$ can be increased relative to the number $N_L$ of rotations of the left front wheel $W_{FL}$ in accordance with such increase in number of rotations of the carrier member 11. Thus, any torque can be transmitted from the left front wheel $W_{FL}$ which is the inner wheel during turning of the vehicle to the right front wheel $W_{FR}$ which is the outer wheel during turning of the vehicle.

It is possible to provide a desired distribution of the torque between the left and right front wheels $W_{FL}$ and $W_{FR}$ under a normal condition of travel of the vehicle by setting the acceleration ratio in a range of 1.05 to 1.20 and adjusting the engagement forces of the decelerating hydraulic clutch Cd and the accelerating hydraulic clutch Ca. Namely, it is possible to transmit a large torque to the wheel which is an outer wheel during turning of the vehicle than to the wheel which is an inner wheel during turning of the vehicle, when the vehicle is traveling at medium or lower speed, thereby enhancing the turning performance. In addition, it is possible to reduce the torque transmitted to the wheel which is an outer wheel during turning of the vehicle, when the vehicle is traveling at a higher speed, as compared with when the vehicle is traveling at a medium or lower speed, thereby enhancing the travel stability performance.

In this embodiment, it is not necessary to dispose a rotary shaft outside the decelerating hydraulic clutch Cd and the accelerating hydraulic clutch Ca and hence, it is possible to decrease the radial dimension of the power transmitting device to achieve a compactness.

Figure 4:
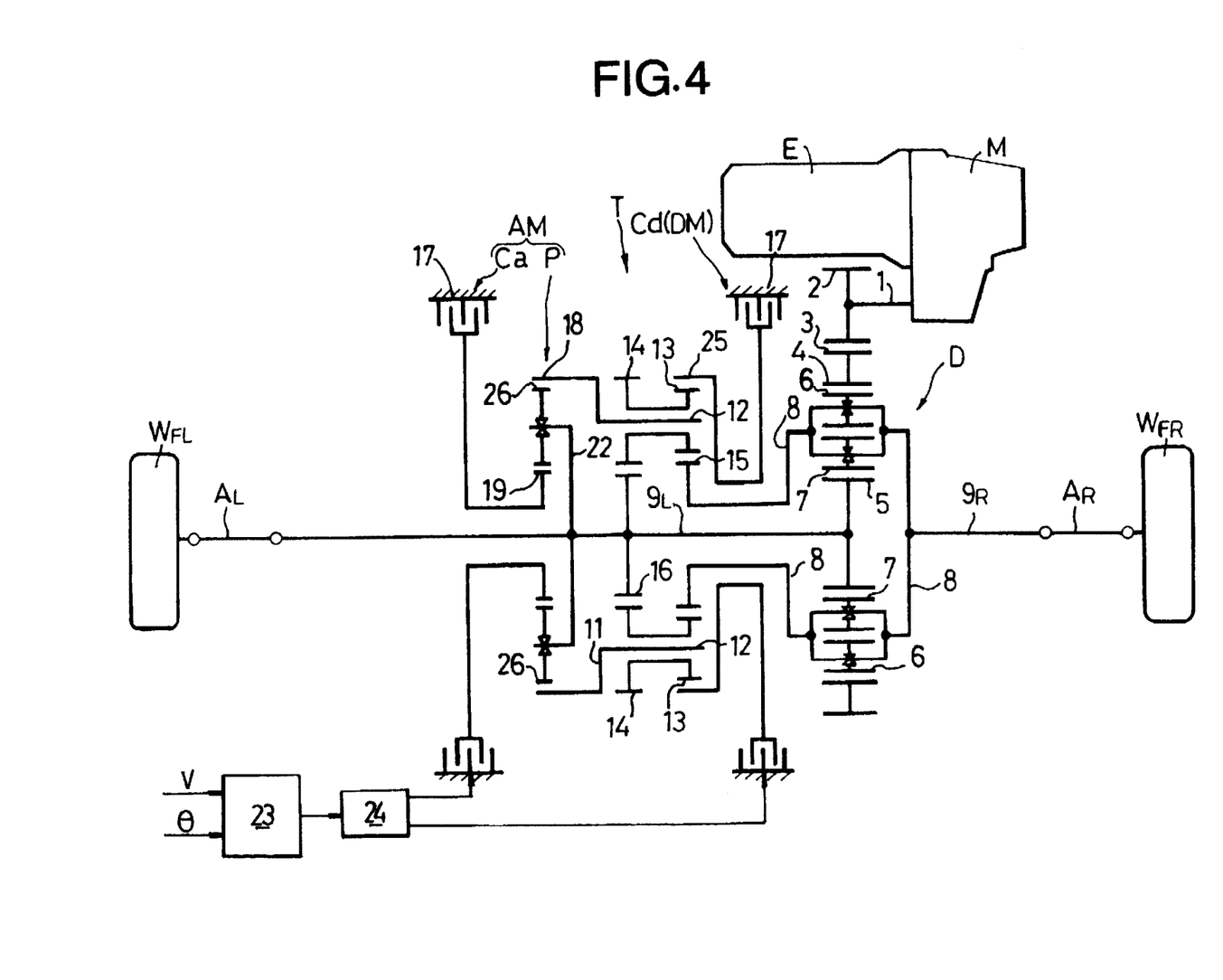
FIG. 4 is a skeleton illustration of a power transmitting system in a front engine and front drive vehicle according to a second embodiment of the present invention.

A second embodiment of the present invention will now be described with reference to FIG. 4.

The second embodiment is different from the first embodiment in respect of the structure of a carrier member decelerating means DM and the structure of a carrier member accelerating means AM. The other arrangements are the same as in the first embodiment.

More specifically, the carrier member decelerating means DM comprising a decelerating hydraulic clutch Cd serves to couple a restricting ring gear 25, meshed with the first pinion 13, to the casing 17. If the rotation of the restricting ring gear 25 is stopped or reduced by the decelerating hydraulic clutch Cd during clockwise turning of the vehicle, the first and second pinions 13 and 14, carried on the carrier member 11, perform their planetary motions, thereby increasing the number $N_L$ of rotations of the left front wheel $W_{FL}$ relative to the number $N_R$ of rotations of the right front wheel $W_{FR}$.

Consequently, a portion of the torque of the right front wheel $W_{FR}$, which is an inner wheel during turning of the vehicle, is transmitted to the left front wheel $W_{FL}$, which is an outer wheel during turning of the vehicle. Alternatively, the restriction ring gear 25 may be meshed with the second pinion 14, in place of being meshed with the first pinion 13.

On the other hand, the carrier member accelerating means AM is comprised of a planetary gear device P and an accelerating hydraulic clutch Ca. The planetary gear device P includes a ring gear 18, a sun gear 19, a planetary carrier 22 and a planetary gear 26. The ring gear 18 is integrally formed on the carrier member 11, and the sun gear 19 is capable of being coupled to the casing 17 by the accelerating hydraulic clutch Ca. The planetary carrier 22 is coupled to the left output shaft $9_L$.

If the rotation of the sun gear 19 is stopped or limited by the accelerating hydraulic clutch Ca during counterclockwise turning of the vehicle, the rotation of the left output shaft $9_L$ is transmitted to the carrier member 11 in an increased form through the planetary carrier 22, the planetary gear 26 and the ring gear 18. This causes the number $N_R$ of rotations of the right front wheel $W_{FR}$ to be increased relative to the number $N_L$ of rotations of the left front wheel $W_{FL}$. Thus, a portion of the torque of the left front wheel $W_{FL}$ which is the inner wheel during turning of the vehicle is transmitted to the right front wheel $W_{FR}$ which is the outer wheel during turning of the vehicle.

Even in the second embodiment, it is possible to remove the rotary shaft from outside the decelerating hydraulic clutch Cd and the accelerating hydraulic clutch Ca, thereby achieving the compactness in power transmitting device for the vehicle.

A third embodiment of the present invention will now be described with reference to FIGS. 5 to 8.

Figure 5:
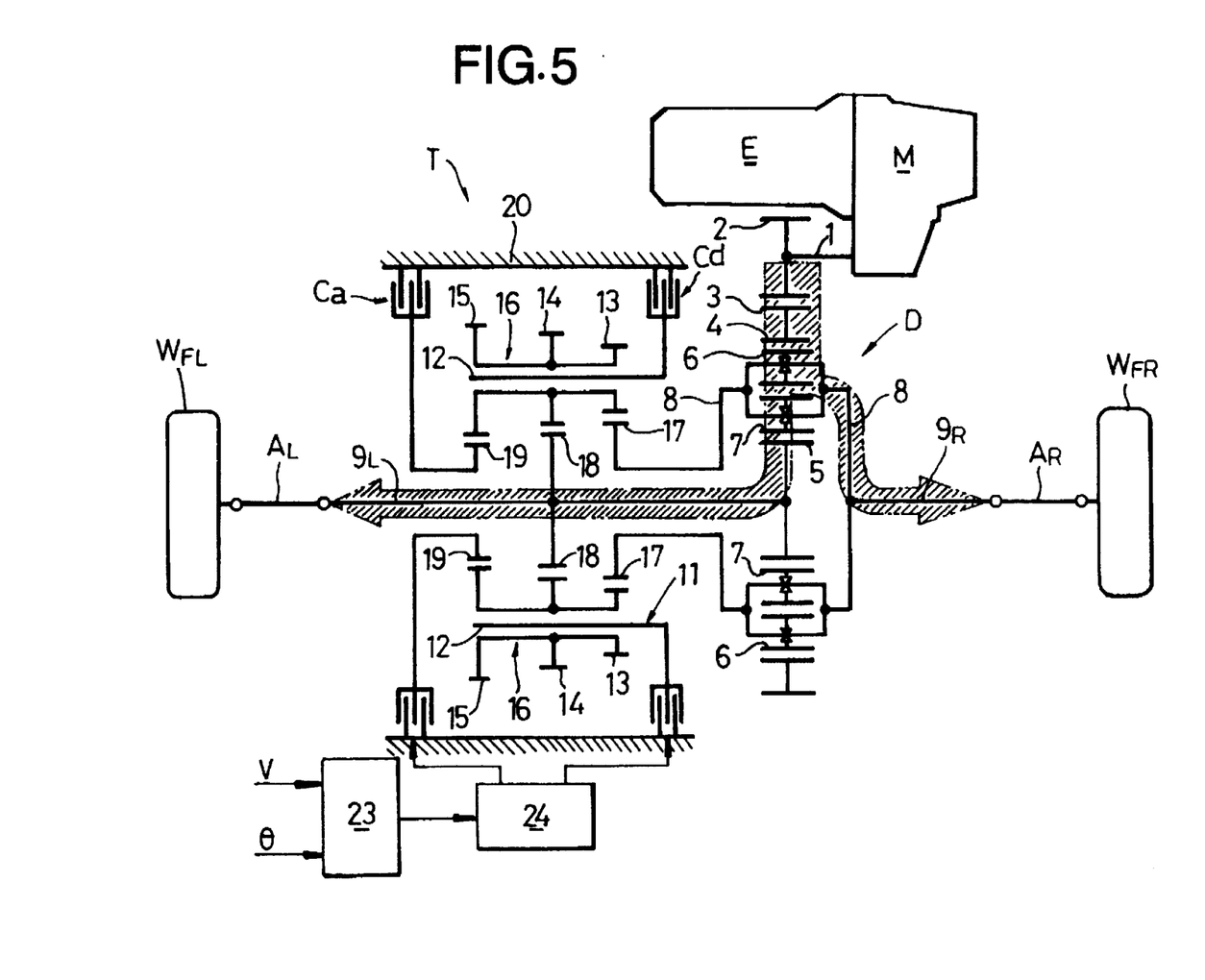
FIG. 5 is a skeleton illustration of a power transmitting system in a front engine and front drive vehicle according to a third embodiment of the present invention.

Referring to FIG. 5, a carrier member 11 is rotatably supported around an outer periphery of a left output shaft $9_L$, and includes four pinion shafts 12 disposed at circumferentially 90° spaced-apart distances. At triple pinion member 16 having first, second and third pinions 13, 14 and 15 integrally formed thereon is rotatably carried on each of the pinion shafts 12. The number N of the triple pinion members 16 is four in the embodiment, but is not limited to four and may be any number of two or more (N=2, 3, 4, 5, 6 . . . ).

A first sun gear 17 is rotatably carried around the outer periphery of the left output, or rotary shaft $9_L$ and meshed with the first pinion 13. The first sun gear 17 is connected to the planetary carrier 8 of the differential D. A second sun gear 18 is fixed to the outer periphery of the left output, or rotary shaft $9_L$ and is meshed with the second pinion 14. Further, a third sun gear 19 is rotatably carried around the outer periphery of the left output shaft $9_L$ and is meshed with the third pinion 15.

The numbers of teeth of the first, second and third pinions 13, 14 and 15 and the first, second and third sun gears 17, 18 and 19 in the embodiment are as follows:

Number $Z_2$ of teeth of the first pinion 13=17.
Number $Z_4$ of teeth of the second pinion 14=17.
Number $Z_6$ of teeth of the third pinion 15=34.
Number $Z_1$ of teeth of the first sun gear 17=32.
Number $Z_3$ of teeth of the second sun gear 18=28.
Number $Z_5$ of teeth of the third sun gear 19=32.

If the modules of the first pinion 13 and the first sun gear 17 meshed with each other are equalized, the modules of the second pinion 14 and the second sun gear 18 meshed with each other are equalized, and the modules of the third pinion 15 and the third sun gear 19 meshed with each other are equalized, all the modules of the first, second and third pinions 13, 14 and 15 and the first, second and third sun gears 17, 18 and 19 need not be equalized.

Figure 6A:
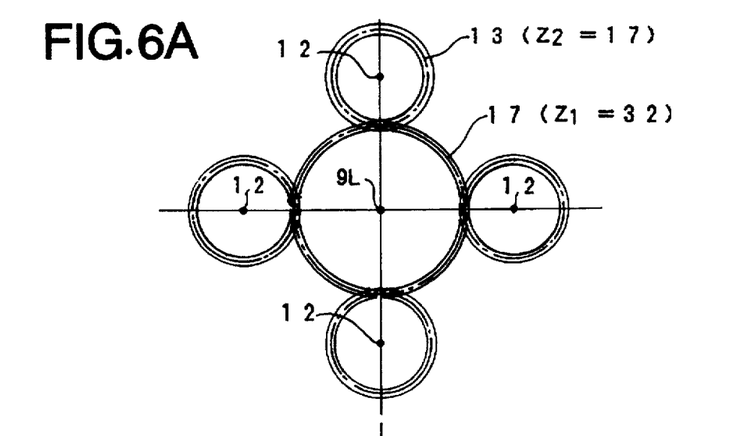
FIGS. 6A to 6C are diagrams illustrating the relationship between the numbers of teeth of pinions and sun gears.
Figure 6B:
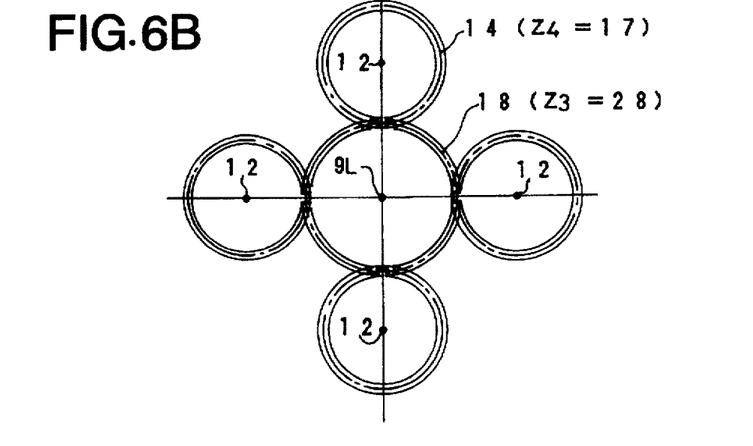
Figure 6C:
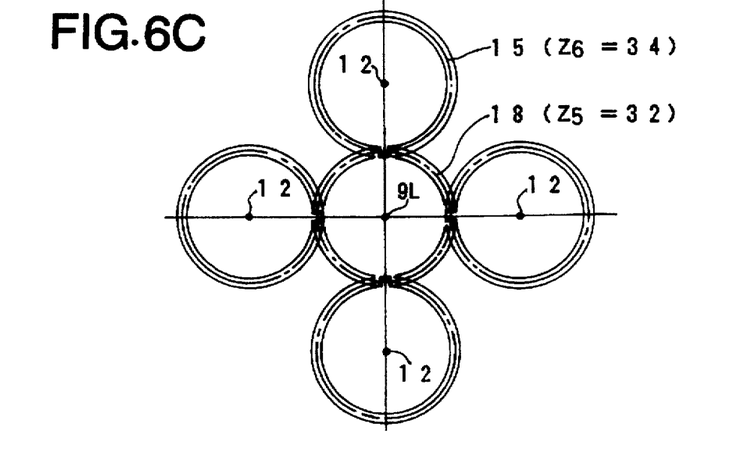

As can be seen from FIGS. 6A, 6B and 6C, the numbers of teeth of the first, second and third pinions 13, 14 and 15 are set so as to be any of M, 2M, 3M, 4M, 5M . . . , wherein M represents a minimum number of teeth of these pinions. In the embodiment, the minimum number M of teeth is set so that M=17 for each of the first and second pinions 13 and 14, and 2M=34 for the third pinion 15.

By setting the numbers of teeth of the first, second and third pinions 13, 14 and 15 in the above manner, phases of the teeth of the first, second and third pinions 13, 14 and 15 can be trued up circumferentially. In meshing the first, second and third pinions 13, 14 and 15 with the first, second and third sun gears 17, 18 and 19 when the triple pinion member 16 is assembled, the need for positioning of the triple pinion member 16 in a rotating direction is eliminated, leading to a substantially enhanced assemblability.

The numbers of teeth of the first, second and third sun gears 17, 18 and 19 are set so as to be any of multiples of N, i.e., N, 2N, 3N, 4N, 5N . . . , based on the number N of the triple pinion member 16. In this embodiment, N=4, and the number of teeth of each of the first and third sun gears 17 and 19 is set at 8N=32, while the number of teeth of the second sun gear 18 is set at 7N=28.

By setting the numbers of teeth of the first, second and third sun gears in the above manner, the phases of the teeth of the first, second and third sun gears 17, 18 and 19 can be matched in four circumferentially 90° spaced-apart positions of the first, second and third sun gears 17, 18 and 19, i.e., in positions in which the four triple pinion members 16 are meshed. As a result, it is not necessary to produce a plurality of types of triple pinion member 16 with different phases of teeth of first, second and third pinions 13, 14 and 15, and it is possible to use the same member for the four triple pinion members 16 to reduce the manufacture cost.

The first sun gear 17 and the planetary carrier 8 constitute a first connecting means for connecting the first pinion 13 to the right output shaft $9_R$, and the second sun gear 18 constitutes a second connecting means for connecting the second pinion 14 to the left output shaft $9_L$.

The third sun gear 19 is capable of being coupled to a casing 20 through the accelerating clutch Ca. The third sun gear 19 and the accelerating clutch Ca constitute a third connecting means and serve to increase the number of rotations of the carrier member 11 by the engagement of the accelerating clutch Ca.

The carrier member 11 is capable of being coupled to the casing 20 through the decelerating clutch Cd. The decelerating clutch Cd constitutes a fourth connecting means and serves to decrease the number of rotations of the carrier member 11 by the engagement thereof.

The decelerating hydraulic clutch Cd and the accelerating hydraulic clutch Ca are controlled through the hydraulic circuit 24 by the electronic control unit 23 to which a vehicle speed V and a steering angle θ are inputted.

The operation of the third embodiment of the present invention will be described below.

When the vehicle is traveling in a straight path, both of the decelerating hydraulic clutch Cd and the accelerating hydraulic clutch Ca are brought into their non-engaged states. This causes the restriction of the carrier member 11 and the third sun gear 19 to be released, so that all of the left and right axles $9_L$ and $9_R$, the planetary carrier 8 of the differential D and the carrier member 11 are rotated in unison. During this time, the torque of the engine E is transmitted through the differential D equally to the left and right front wheels $W_{FL}$ and $W_{FR}$, as shown by an obliquely lined arrow in FIG. 5.

Figure 7:
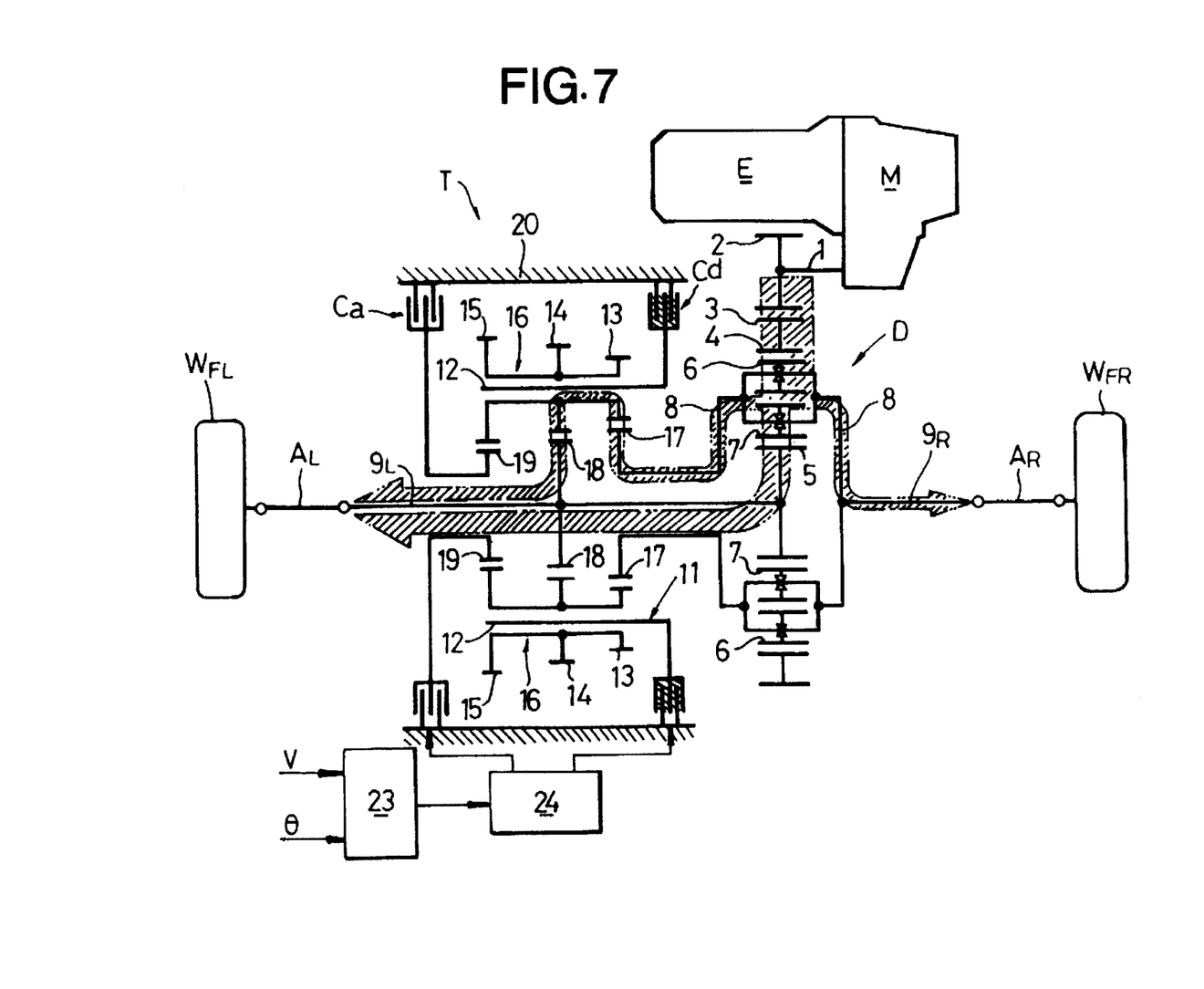
FIG. 7 is an illustration for explaining the operation of the power transmitting system during clockwise turning of the vehicle.

When the vehicle is turning in a clockwise direction, the decelerating hydraulic clutch Cd is brought into the engaged state through the electronic control unit 23 and the hydraulic circuit 24, as shown in FIG. 6, thereby coupling the carrier member 11 to the casing 20 to stop the carrier member 11. At this time, the left output shaft $9_L$ integral with the left front wheel $W_{FL}$ and the right output shaft $9_R$ integral with the right front wheel $W_{FR}$ (and thus, the planetary carrier 8 of the differential D) are interconnected through the second sun gear 18, the second pinion 14, the first pinion 13, and the first sun gear 17. Hence, the number $N_L$ of rotations of the left front wheel $W_{FL}$ is increased relative to the number $N_R$ of rotations of the right front wheel $W_{FR}$ according to the following expression:

$$\frac{N_L}{N_R} = (Z_4/Z_3) \times (Z_1/Z_2) = 1.143 \tag{3}$$

When the number $N_L$ of rotations of the left front wheel $W_{FL}$ is increased relative to the number $N_R$ of rotations of the right front wheel $W_{FR}$ in the above manner, a portion of the torque of the right front wheel $W_{FR}$ which is the inner wheel during turning of the vehicle can be transmitted to the left front wheel $W_{FL}$ which is the outer wheel during turning of the vehicle, as shown by an obliquely lined arrow in FIG. 7.

If the number of rotations of the carrier member 11 is reduced by properly adjusting the engagement force of the carrier member 11, in place of stopping of the carrier member 11 by the decelerating hydraulic clutch Cd, the number $N_L$ of rotations of the left front wheel $W_{FL}$ can be increased relative to the number $N_R$ of rotations of the right front wheel $W_{FR}$ in accordance with such reduction of number of rotations of the carrier member 11. Thus, any torque can be transmitted from the right front wheel $W_{FR}$ which is an inner wheel during turning of the vehicle to the left front wheel $W_{FL}$ which is an outer wheel during turning of the vehicle.

Figure 8:
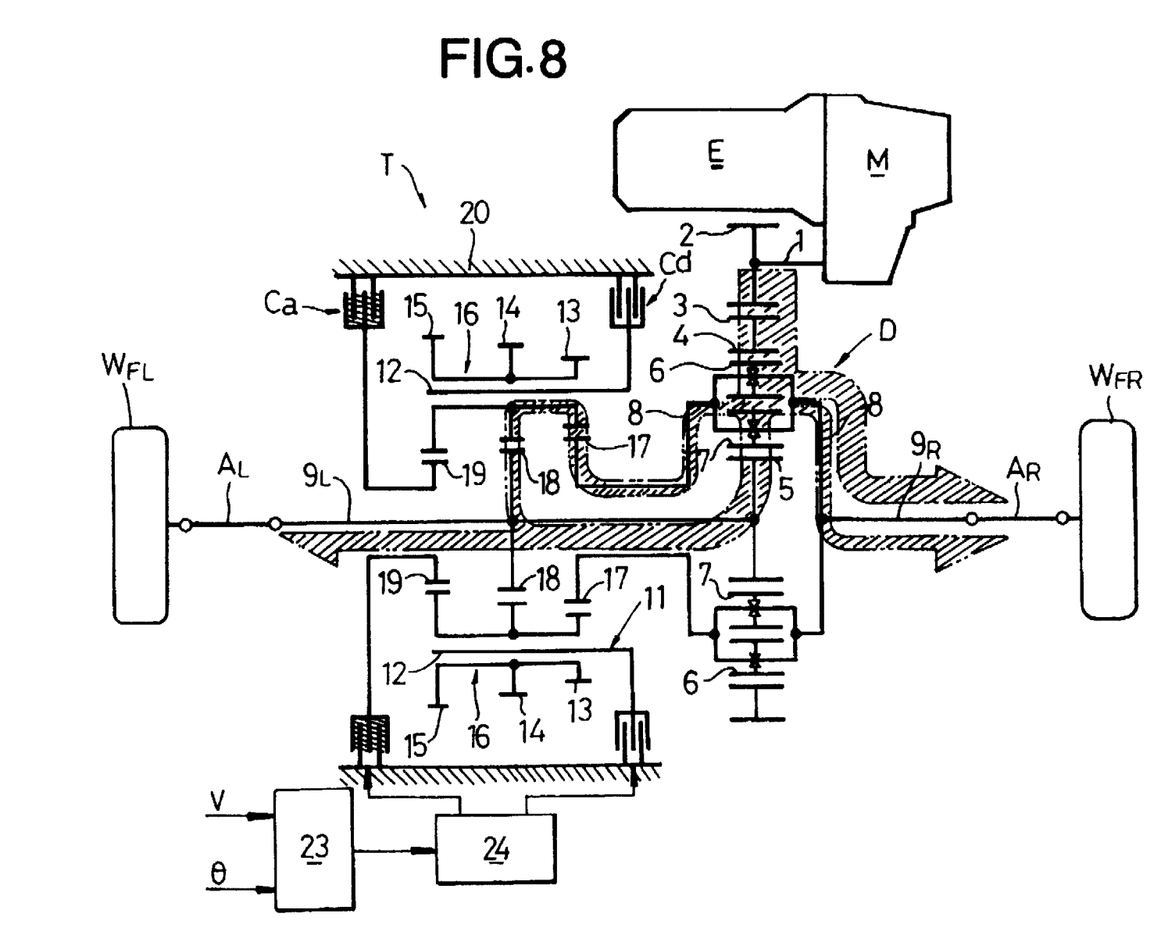
FIG. 8 is an illustration for explaining the operation of the power transmitting system during counterclockwise turning of the vehicle.

On the other hand, when the vehicle is turning in counterclockwise direction, the accelerating hydraulic clutch Ca is brought into the engaged state through the electronic control unit 23 and the hydraulic circuit 24, as shown in FIG. 8, and the third pinion 15 is coupled to the casing 20 through the third sun gear 19. As a result, the number of rotations of the carrier member 11 is increased relative to the number of rotations of the left output shaft $9_L$, and the number $N_R$ of rotations of the right front wheel $W_{FR}$ is increased relative to the number $N_L$ of rotations of the left front wheel $W_{FL}$ according to the following expression.

$$\frac{N_R}{N_L} = \frac{1 - (Z_5/Z_6) \times (Z_2/Z_1)}{1 - (Z_5/Z_6) \times (Z_4/Z_3)} = 1.167 \tag{4}$$

When the number $N_R$ of rotations of the right front wheel $W_{FR}$ is increased relative to the number $N_L$ of rotations of the left front wheel $W_{FL}$, in the above manner, a portion of the torque of the left front wheel $W_{FL}$, which is an inner wheel during turning of the vehicle, can be transmitted to the right front wheel $W_{FR}$, which is an outer wheel during turning of the vehicle, as shown by an obliquely lined arrow in FIG. 8. Even in this case, if the number of rotations of the carrier member 11 is increased by properly adjusting the engagement force of the accelerating hydraulic clutch Ca, the number $N_R$ of rotations of the right front wheel $W_{FR}$ can be increased relative to the number $N_L$ of the left front wheel $W_{FL}$ in accordance with such increase of the number of rotations of the carrier member 11. Thus, any torque can be transmitted from the left front wheel, which is the inner wheel during turning of the vehicle, to the right front wheel $W_{FR}$ which is the outer wheel during turning of the vehicle.

As apparent from the comparison of the expressions (3) and (4), the acceleration ratio (about 1.143) of the left front wheel $W_{FL}$ to the right front wheel $W_{FR}$ and the acceleration ratio (about 1.167) of the right front wheel $W_{FR}$ to the left front wheel $W_{FL}$ can be substantially equalized to each other by setting of the number of teeth of each of the first, second and third pinions 13, 14 and 15 and the first, second and third sun gears 17, 18 and 19 in the above-described manner.

If the acceleration ratios represented by the expressions (3) and (4) are set in a range of 1.05 to 1.20, in addition to the setting of the number of teeth of each of the first, second and third pinions 13, 14 and 15 and the first, second and third sun gears 17, 18 and 29 so as to satisfy the above-described conditions, it is possible to provide a desired distribution of the torque between the left and right front wheels $W_{FL}$ and $W_{FR}$ under the usual travel condition of the vehicle by adjusting the engagement forces of the decelerating hydraulic clutch Cd and the accelerating hydraulic clutch Ca. Namely, when the vehicle is traveling at a medium or lower speed, a larger torque can be transmitted to the wheel which is an outer wheel during turning of the vehicle than to the wheel which is an inner wheel during turning of the vehicle, thereby enhancing the turning performance. In addition, when the vehicle is traveling at a higher speed, the torque transmitted to the wheel which is an outer wheel during turning of the vehicle can be decreased, as compared with when the vehicle is traveling at the medium or lower speed, thereby enhancing the travel stability performance.

In this embodiment, the planetary gear device for increasing the number of rotations of the carrier member 11 is not required, and the function of the planetary gear device can be compensated by the only two members: the third pinion 15 and the third sun gear 19, thereby reducing the number of parts, the size of the system and the manufacture cost.

Although the embodiments of the present invention have been described in detail, it will be understood that the present invention is not limited to the above-described embodiments, and various modifications in design may be made without departing from the spirit and scope of the invention defined in claims.

For example, the power transmitting device for the vehicle is not limited to the use for transmitting the torque between the left and right driving wheels, and may be used for transmitting the torque between front and rear driving wheels in a four-wheel drive vehicle, as well as for transmitting the torque between follower wheels. In addition, the decelerating hydraulic clutch Cd and the accelerating hydraulic clutch Ca can be replaced by an electromagnetic clutch or a fluid coupling. Further, although the decelerating hydraulic clutch Cd has been disposed at the right end of the carrier member 11 in the third embodiment, it may be disposed at a left end of the carrier member 11.

What is claimed is:

1. A power transmitting system for a vehicle having an input shaft and two rotary output shafts connected to said input shaft through a differential for receiving a torque from said input shaft, comprising a torque transmitting means mounted between said two rotary shafts and capable of transmitting a torque between said two rotary shafts, said torque transmitting means comprising a carrier member rotatably carried for rotation about one of said rotary shafts, first and second pinions integrally formed to have different pitch circle radii and rotatably carried on said carrier member, connecting means for connecting said first and second pinions to said rotary shafts, respectively, a carrier member accelerating member for accelerating said carrier member and a carrier member decelerating means for decelerating said carrier member.

2. A power transmitting system for a vehicle according to claim 1, wherein said carrier member accelerating means comprises a planetary gear device and an accelerating clutch, and wherein said planetary gear device comprises, a sun gear, a ring gear and a planetary carrier, and a first one of said sun gear, said ring gear and said planetary carrier is connected to said one of the rotary shafts and a second one of said sun gear, said ring gear and said planetary carrier is connected to said carrier member, and said accelerating clutch connects a third one of said sun gear, said ring gear and said planetary carrier to a fixing member.

3. A power transmitting system for a vehicle according to claim 1, wherein said carrier member decelerating means comprises a decelerating clutch for connecting said carrier member to a fixing member.

4. A power transmitting system for a vehicle according to claim 1, wherein said carrier member decelerating means comprises a decelerating clutch for connecting a restricting ring gear meshed with one of said first pinion and second pinion to a fixing member.

5. A power transmitting system for a vehicle having an input shaft and two rotary output shafts connected to said input shaft through a differential for receiving a torque from said input shaft, comprising a torque transmitting means mounted between said two rotary shafts and capable of transmitting a torque between said two rotaty shafts, wherein said torque transmitting means comprises: a carrier member rotatably carried for rotation about one of said rotary shafts; a plurality of triple-pinion members which are rotatably carried on said carrier member and each of which includes first, second and third pinions provided thereon and non-rotatable relative to one another and having different pitch circles; a first connecting means for connecting said first of said pinions to the other of said rotary shafts; a second connecting means for connecting said second of said pinions to said one of said rotary shafts; a third connecting means for connecting said third of said pinions to a fixing member; and a fourth connecting means for connecting said carrier member to said fixing member.

6. A power transmission system for a vehicle according to claim 5 wherein an N-number (N=2, 3, 4, 5, 6 . . . ) of said triple pinion members are integrally formed and disposed at equal distances on a circumference of said carrier member, a number of teeth on each of the first, second and third pinions being any of M, 2M, 3M, 4M, 5M . . . (M=a minimum number of teeth of the first, second and third pinions), and a number of teeth of each of a first sun gear of the first connecting means meshed with said first of said pinions, a second sun gear of the second connecting means meshed with said second of said pinions and a third sun gear of the third connecting means meshed with said third of said pinions being any of 2N, 3N, 4N, 5N, 6N . . . .

* * * * *